United States Patent

[11] 3,559,773

| [72] | Inventor | Thomas H. Hock |
| | | Milwaukee, Wis. |
| [21] | Appl. No. | 676,251 |
| [22] | Filed | Oct. 18, 1967 |
| [45] | Patented | Feb. 2, 1971 |
| [73] | Assignee | AMF Incorporated |
| | | Jersey City, N.J. |
| | | a corporation of New Jersey, by mesne assignments |

[54] BRAKE AND AUTOMATIC SPEED LIMITER ARRANGEMENT
9 Claims, 4 Drawing Figs.

[52] U.S. Cl. ................................................. 188/187,
188/72.1, 188/106
[51] Int. Cl. .......................................... B60t 7/12,
B60t 13/08
[50] Field of Search .......................................... 188/72W,
73, 106, 181A, 187, 180, 72.1

[56] References Cited
UNITED STATES PATENTS
1,503,818  8/1924  Crane........................... 188/180X 2,451,109  10/1948  Nardone....................... 188/187X
2,550,111  4/1951  Else.............................. 188/187X
3,194,349  7/1965  Kershner et al............... 188/72(W)X

*Primary Examiner*—Duane A. Reger
*Attorneys*—John W. Michael, Gerrit D. Foster, Bayard H. Michael, Paul R. Puerner, Joseph A. Gemignani, Andrew O. Riteris and Spencer B. Michael

ABSTRACT: This disclosure relates to a combination brake and speed limiting mechanism wherein a manually operated brake operates on a rotatable brake disc to produce selective braking action. The disc is connected to a source to be braked so that braking action is transmitted to the source. An additional brake friction pad, that is in addition to the friction pads of the manual brake assembly, is supported adjacent the brake disc and is normally disengaged from the brake disc so that it does not interfere with manual braking action. A centrifugally responsive actuator is also connected to the source to be braked and responds to the speed of the source to effect, at a preselected speed, engagement between the brake disc and the additional friction pad and a friction pad of the manual brake assembly to retard speed.

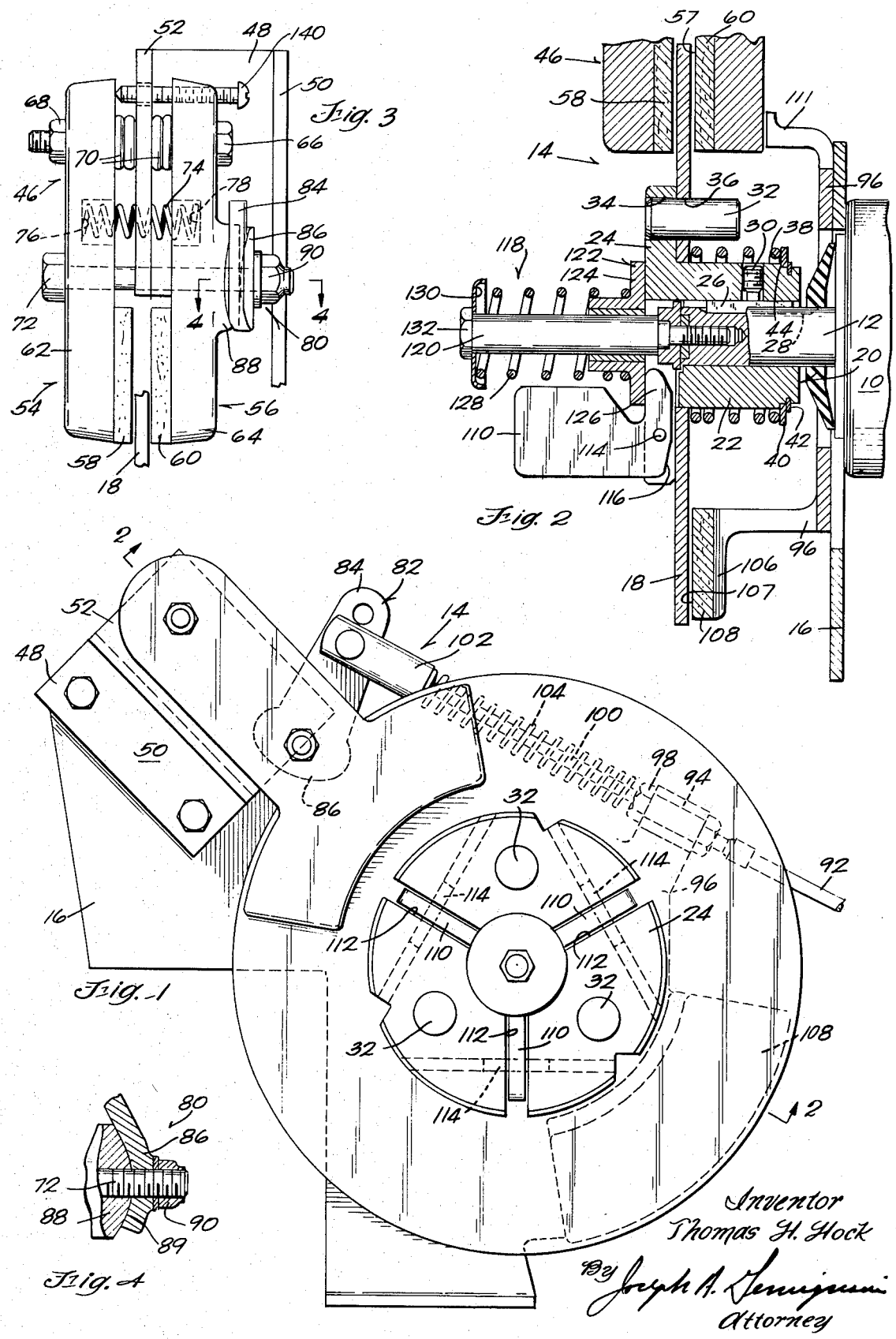

BRAKE AND AUTOMATIC SPEED LIMITER ARRANGEMENT

BACKGROUND OF INVENTION

1. Field of Invention

This invention relates to speed control mechanism such as brakes and speed limiting assemblies and, more particularly, to such mechanisms as are incorporated in self propelled vehicles such as golf carts and the like.

2. Description of Prior Art

Manually operated brake assemblies are well known as are various types of speed responsive brakes and governor arrangements. Heretofore, these two types of assemblies have either not been used together or have been separate from each other or have functioned independently thereby resulting in a relatively complex arrangement.

SUMMARY OF INVENTION

In accordance with this invention, a combination brake and speed limiting assembly is associated with a brake member which is connected to a source to be braked. The speed limiting arrangement is operatively associated with the brake member, responds to the speed of the source, and is operative to brake the source through the brake member when the source reaches a predetermined speed. The brake portion of the assembly selectively brakes and releases the source through the brake member. In accordance with more specific aspects of this invention, a part of the brake portion also forms a portion of the speed limiting arrangement and the speed responsive arrangement includes a centrifugally operated actuator. The centrifugally operated actuator is connected for response to the source speed and produces a force opposing brake member movement which corresponds in magnitude to the speed of the source.

DESCRIPTION OF DRAWINGS

FIG. 1 is a front elevation of a combination brake and automatic speed limiting arrangement incorporating this invention;

FIG. 2 is a partial section view along lines 2-2 of FIG. 1;

FIG. 3 is a side elevation of the manually operable portion of the combination; and FIG. 4 is a partial section along line 4-4 of FIG. 3.

DESCRIPTION OF PREFERRED EMBODIMENT

This invention will perhaps find its primary application in self-propelled such as golf carts and the like, and particularly electrically powered vehicles of this type. Since the details of the vehicle are not necessary to a thorough understanding of this invention, the vehicle has not been illustrated. All that is shown is part of an electrical traction motor which is connected to and powers the drive wheels of the vehicle in a suitable conventional manner. It will also be appreciated that reference to the brake as being manually operable is intended to include both hand and foot operation, and that although the speed limiting portion is referred to as such it could also function as a brake.

With particular reference to the drawings, electrical traction motor 10 is suitable mounted within a vehicle (not shown) and through a conventional transmission (not shown) provides the source of motive power for the vehicle. Motor shaft 12 extends from one end of motor 10 and brake and speed limiting assembly 14 is connected to the traction motor through shaft 12. Base bracket 16 of assembly 14 provides the means of connection between the assembly and motor 10.

Assembly 14 includes brake disc 18 supported on hub 20. The hub includes cylindrical body 22 and flange 24. Key 26 and key way 28 provide a keyed connection between the shaft and hub through which rotary shaft motion is transmitted to the hub. Set screw 30 assists in holding the hub in position on shaft 12. Hub rotation is transmitted to disc 18 by pins 32. The pins are pressed into openings 34 in flange 24 and extend through slightly oversized openings 36 in the brake disc. For a purpose which will be discussed more completely hereinafter, compression spring 38 is seated between disc 18 and washer 40, washer 40 being held in position on the hub body 22 by retainer 42 and shoulder 44. With this construction brake disc 18 is rotatable with hub 20 but is freely slidable relative to the hub in an axial direction.

Caliper brake assembly 46 is supported from base bracket 16 and produces selective braking action of motor 10 through brake disc 18. Structurally, mounting bracket 48 is attached to the base bracket and is generally Z-shaped with one leg 50 thereof bolted to the base bracket as illustrated and the other leg 52 supporting brake shoe assemblies 54 and 56. The brake shoe assemblies include friction pads 58 and 60 attached to support arms 62,64. The brake shoe assemblies are connected to bracket leg 52 by through bolt 66, nut 68 and spring washers 70. A second through bolt 72 extends through the brake shoe assemblies at a point spaced from through bolt 66, bolt 72 passing through a clearance opening so that while it holds the brake shoes in assembled relationship the brake shoe assemblies are free to move on the bolt. Compression spring 74 is seated in opposed blind openings 76 and 78 in bodies 62 and 64 and serves to bias the brake shoe assemblies away from each other about a pivot provided by screw 140. (It should be noted at this point that through bolt 66 also passes through a clearance opening to permit this pivotal movement.)

The caliper brake assembly is positioned so that pads 58 and 60 are located on opposite sides of brake disc 18 as illustrated. Spring 74 normally holds the friction pads out of engagement with the brake disc so that the latter is free to rotate with hub 20. In order to brake motor 10 the friction pads are moved towards each other and into engagement with brake disc 18. This motion is achieved by cam assembly 80. The cam assembly includes operating lever 82 having a handle 84 and cam end 86. The cam end is engaged on projection 88 on support arm 64 of brake shoe assembly 56. The surface 89 of the projection is arcuate in cross section and cam end 86 has a complimentary cross section so that when in the position illustrated the cam end nests on the projection (see FIG. 4). The cam end is seated against nut 90 but is free to rotate on bolt 72 so that when the operating lever is rotated from the position illustrated the cam end rides on surface 89 and urges brake shoe assemblies 54 and 56 toward each other clamping the brake disc between pads 58 and 60. In this manner a braking force can be applied to the brake disc and through the brake disc to motor 10.

Any suitable connection can be made from operating lever 82 to either a foot brake pedal or a hand operated brake lever. For example, flexible cable 92 extends from a foot pedal (not shown) and is supported at arm 94 on mounting bracket 96 by conventional coupling 98. Operating wire 100 of the flexible cable extends through the coupling and terminates in a yoke 102 connected to operating lever 82. Compression spring 104 is seated between the yoke and coupling 98 and normally biases the operating lever to the illustrated position, i.e., the position where cam end 86 nests on the surface of projection 88. By manipulation of flexible cable 92 the caliper brake can be engaged with and disengaged from the brake disc to brake motor 10, the drive source and, correspondingly, the vehicle powered by the source.

The portion of the brake and speed limiting governor assembly discussed to this point provides for selective braking of the vehicle but another problem encountered in vehicles of this type, particularly electrical powered vehicles, is that the vehicles may tend to speed up when, for example, proceeding down hill. This can produce excessive speeds which create a hazard for the vehicle and its occupants. This invention solves that problem with a speed limiting assembly. In this respect mounting bracket 96, which is suitably attached to base bracket 16, includes a formed portion 106 carrying an additional brake friction pad 108. Pad 108 is spaced from brake shoe assemblies 54 and 56 and is also normally spaced from brake disc 18 when the brake disc is in engagement with hub flange 24 Friction pad 108 and brake shoe assembly 56, of the caliper brake assembly, cooperate to provide the brake friction surfaces functioning in the speed limiting assembly. Mounting bracket 96 includes a second turned portion 111 which is positioned at brake shoe assembly 56 and limits movement of that assembly away from the brake disc so that the working surface 57 of its pad 60 is maintained in general alignment with the working surface 107 of pad 108 or, in other words, to a position where surfaces 57 and 107 are coplanar and both are generally parallel to disc 18.

A speed responsive operator is associated with brake disc 18 and is connected to motor 10 for response to the speed of the motor and, in accordance with that speed is operative to move the brake disc into engagement with pads 60 and 108 to oppose and retard the motor speed. Structurally, this speed responsive actuating mechanism includes weights 110 connected in slots 112 in hub 20. Three such weights, and accommodating slots, are provided with the weights being pivotally supported on three pins 114. With this arrangement weights 110 will tend to pivot outwardly with respect to the axis of rotation of brake disc 18 as motor speed increases, and in doing so cam surfaces 116 of the weights engage the brake disc and move it to the right, as viewed in the drawings, and into engagement with friction pads 60 and 108. In order to normally bias the weights 110 to the position illustrated, i.e., where they are disengaged from brake disc 18 so as not to interfere with normal brake disc rotation, assembly 118 is provided. This assembly includes stud assembly 120 threaded into the end of shaft 12. Retainer 122 is positioned on stud 120 and includes a flange 124 engaging arms 126 of weights 110. A compression spring 128 is seated between flange 124 and cap 130 positioned at the head 132 of stud 120. With this arrangement spring 128 biases retainer 122 into engagement with weights 110 and tends to normally hold the weights in the position illustrated. It will be noted that flange 122 engages hub 20 to limit the inward movement of the retainer and, correspondingly cooperate in establishing the rest position of the weights. Only one weight 110 and its connection and operation in the assembly has been illustrated and described in detail, the others are identical in construction and operation and the description of one should suffice for all.

Spring 38 normally positions brake disc 18 in engagement with hub flange 24, in which position it is spaced from pads 58, 60 and 108 and it and the motor are not opposed by any retarding force. As the speed of motor 10 increases the centrifugal force acting on weights 110 also increases and eventually overcomes the combined force of springs 38 and 128 to pivot the weights radially outwardly to engage cam surfaces 116 with the brake disc and urge it into engagement with the friction pads with a force which corresponds to the speed of the motor. Accordingly, as the motor speed increases the brake disc is moved into engagement with friction pads 60 and 108 and with a force which corresponds to and increases in proportion to the speed increase thereby providing a frictional force which opposes and tends to reduce motor a speed. As the speed reduces the weights relax reducing the force on the brake disc allowing spring 38 to return the disc to its free rotating position. This arrangement will act as a speed limiting arrangement, in a sense as a governor, and will set an upper limit on the speed at which the motor can be run and correspondingly the speed of the vehicle being powered by the motor. By adjusting the force of spring 128 the limit of speed of motor 10 can be adjusted as desired. The caliper brake assembly can be operated at any time independent of the speed limiting portion of the assembly and without regard to the state of operation of the speed limiting portion.

This combination brake and speed limiting assembly provides a relatively compact, effective and simplified arrangement for achieving both selective braking operation and also establishing an upper limit on the motor speed. Simplicity in the overall assembly is contributed to by utilizing a part of the selective brake portion as a part of the speed limiting assembly. Moreover, it will be noted that the friction pads (60 and 108) which cooperate in providing the speed limitation are spaced approximately 180° apart or in diametrically opposed relationship with respect to the brake disc and that each of these pads is provided with a substantial working surface. This construction and arrangement of discs 60 and 108 provided engagement with the brake disc in such a manner that the speed limiting force is applied uniformly on disc 18 and without danger of stressing or working the disc and the remaining components of the assembly.

Although but one embodiment of the present invention has been illustrated and described, it will be apparent to those skilled in the art that various changes and modifications may be made therein without departing from the spirit of the invention claim:
1. A brake assembly comprising, in combination:
a brake member;
means for connecting said brake member to and for rotation with a source to be braked;
speed limiting means including generally stationary first friction means positioned adjacent said brake member and centrifugally responsive operating means connected to and responsive to the speed of said source, said centrifugally responsive operating means operative, when the speed of said source reaches a predetermined speed, to engage and move said brake member into engagement with said first friction means to apply a speed limiting braking force to said source through said brake member;
and brake means engageable with said brake member and operative to selectively brake and release said source through said brake member;
said brake means including second friction means; and
said first and second friction means relatively spaced in generally diametrically opposed positions with respect to said brake member so that said brake member is engaged at and said speed limiting force is applied to diametrically opposed areas for stability.
2. The brake assembly of claim 1 wherein:
said brake member comprises a disc; and wherein said operating means is operative to urge said first and second friction means and said brake member into engagement with a force which corresponds in magnitude to the speed of said source in providing said speed limiting brake force.
3. The brake assembly of claim 1 wherein said brake member comprises a disc member and is mounted for rotation and said connecting means connects said brake member to said source for rotation by said source and supports said brake member for axial movement in addition to said rotation.
4. A brake assembly comprising, in combination:
a generally planar disc brake member having first and second oppositely facing, axially directed surfaces;
means for connecting said brake member to and for rotation with a source to be braked and further supporting said brake member for axial movement in addition to rotation;
speed limiting means including generally stationary first friction means positioned adjacent said brake member and centrifugally responsive operating means connected to and responsive to the speed of said source, said centrifugally responsive operating means operative, when the speed of said source reaches a predetermined speed, to engage and move said brake member into engagement with said first friction means to apply a speed limiting braking force to said source through said brake member;
said first and second friction means positioned on the same side of said brake member in confronting relating to an axially directed surface of said brake member; and
said centrifugally responsive means operative to move said brake member axially into engagement with said first and second friction means.
5. The brake assembly of claim 4 wherein:
said means for connecting said brake disc to a source to be braked includes hub means in engagement with and operative to rotate said disc;

said brake disc is connected to said hub means for axial movement with respect to said hub means in addition to rotation with said hub means;

said brake means includes actuating means operative independently of said centrifugally responsive operating means to engage and disengage said second friction means and said brake disc; and wherein said centrifugally responsive operating means acts on and moves said brake disc axially with respect to said hub means to engage said brake disc with said first and second friction means.

6. The brake assembly of claim 5 wherein:

said brake disc has a normal position;

biasing means urging said brake disc to said normal position;

said centrifugally responsive operating means comprises weights pivotally connected to said hub means and biased to a normal position which does not interfere with said brake disc assuming said normal position thereof; and said weights are arranged to pivot, in response to rotation of said hub means, into engagement with said brake disc to move said brake disc from said normal position into engagement with said first and second friction means.

7. The brake assembly of claim 4 wherein said brake means includes friction means disposed on both axially sides of said brake member of actuating means for moving said brake means friction means toward each other to clamp said brake member therebetween.

8. A brake assembly comprising in combination:

a rotatable brake disc;

means for connecting said brake disc to a source to be braked and including hub means in engagement with and operative to rotate said disc;

said brake disc being connected to said hub means for axial movement with respect to said hub means in addition to rotation with said hub means;

speed limiting means including first friction means and centrifugally responsive operating means connected to and rotated by such hub means, said operating means connected to and operative to urge said brake member and said first friction means into engagement with a force corresponding to the centrifugal response of said operating means and thereby apply a braking force to said source through said brake disc;

brake means operatively associated with said brake disc and operative to selectively brake and release said source through said brake member and including second friction means which is also part of said speed limiting means and actuating means operative independently of said centrifugally responsive operating means to engage and disengage said second friction means and said brake disc;

said first and second friction means being relatively spaced in generally diametrically opposed positions with respect to said brake disc so that said brake disc is engaged at and said force is applied to diametrically opposed areas for stability; and wherein said centrifugally responsive operating means acts on and moves said brake disc axially with respect to said hub means to engage said brake disc with said first and second friction means.

9. The brake assembly of claim 8 wherein:

said first and second friction means each include planar working surfaces arranged parallel to said brake disc; and including means for limiting movement of said second friction means to a position wherein the working surfaces of both said first and second friction means are coplanar.